US00RE34759E

United States Patent [19]

Boyette

[11] E Patent Number: Re. 34,759

[45] Reissued Date of Patent: Oct. 18, 1994

[54] REMOVABLE BOOK MARKER STRIP

[76] Inventor: Gladys D. Boyette, 3300 N. Key Dr., Unit 8-W, North Fort Myers, Fla. 33903

[21] Appl. No.: 40,973

[22] Filed: Mar. 31, 1993

Related U.S. Patent Documents

Reissue of:

[64] Patent No.: 4,577,890
Issued: Mar. 25, 1986
Appl. No.: 591,119
Filed: Mar. 19, 1984

[51] Int. Cl.[5] ..... B42D 3/00; B42D 3/12; B42D 3/04; B42L 11/00

[52] U.S. Cl. ..... 281/29; 281/19.1; 281/34; 281/42; 281/51; 412/4

[58] Field of Search ..... 281/42, 34, 51, 29, 281/19.1; 412/4

[56] References Cited

U.S. PATENT DOCUMENTS

| | | | |
|---|---|---|---|
| 732,527 | 6/1903 | Devlin | 281/42 |
| 1,354,354 | 9/1920 | Toland | 281/34 |
| 1,397,605 | 11/1921 | Rhoads | 281/34 |
| 2,560,087 | 7/1951 | Cohn | 281/34 |
| 2,935,337 | 5/1960 | Ecclestone | 281/34 |
| 3,297,341 | 1/1967 | Reed et al. | 281/34 |
| 3,933,375 | 1/1976 | Humphrey | 281/34 |
| 3,981,522 | 9/1976 | Bloom | 281/34 |
| 4,209,187 | 6/1980 | Forest | 281/19 R |
| 4,341,401 | 7/1982 | Arntzen | 412/4 |
| 4,412,692 | 11/1983 | Williams | 281/34 |

FOREIGN PATENT DOCUMENTS

| | | | |
|---|---|---|---|
| 441743 | 1/1936 | United Kingdom | 281/34 |
| 443483 | 2/1936 | United Kingdom | 281/34 |

OTHER PUBLICATIONS

Reader's Digest, circa 1983 (Applicant has not been able to obtain a sample at the time the Reissue Application was filed. To follow).

Reader's Digest, May 1993, the protective cover is comparable to the circa 1983 issues of the same publication.

*Primary Examiner*—Paul A. Bell
*Attorney, Agent, or Firm*—Longacre & White

[57] ABSTRACT

In the [higher priced grade of books, which for example are known generally as the "hard copies" as distinguished from the more economically priced] so-called "paper backs", it is customary to protect the books [by] *with* A so-called [dust shield or] protective cover. These protective covers are generally highly colored and carry a pictorial image of the author, or of some primary incident in the story. When it is necessary to put down the book without finishing reading it in one sitting, it is desirable to have a book marker so that one's place can be quickly and easily found so that the story can be continued without regression. Frequently a portion of a page of newspaper or magazine is torn off to provide a small book marker. By the present invention a narrow perforated [edge] *strip* of the [fold under flap of the book] *protective* cover may be torn off from the [dust shield or] *protective* cover and used as a book marker to mark one's place in the book. As frequently happens, two parties in a family may be alternately reading the same book simultaneously. To accommodate this contingency, [the marginal edges on] both [sides] *fore edges* of the [dust shields] *protective cover* can have perforated [sections] *strips* which can be torn of to provide two book markers. Opposite [sides] *fore edges* of the [dust shield] *protective cover* can conveniently be colored differently so that it is possible to readily distinguish one's book marker from the other. [Similary, the outer] *The fore* edges of [so-called] paper backs can be turned in and perforated to render readily accessible book markers available.

6 Claims, 1 Drawing Sheet

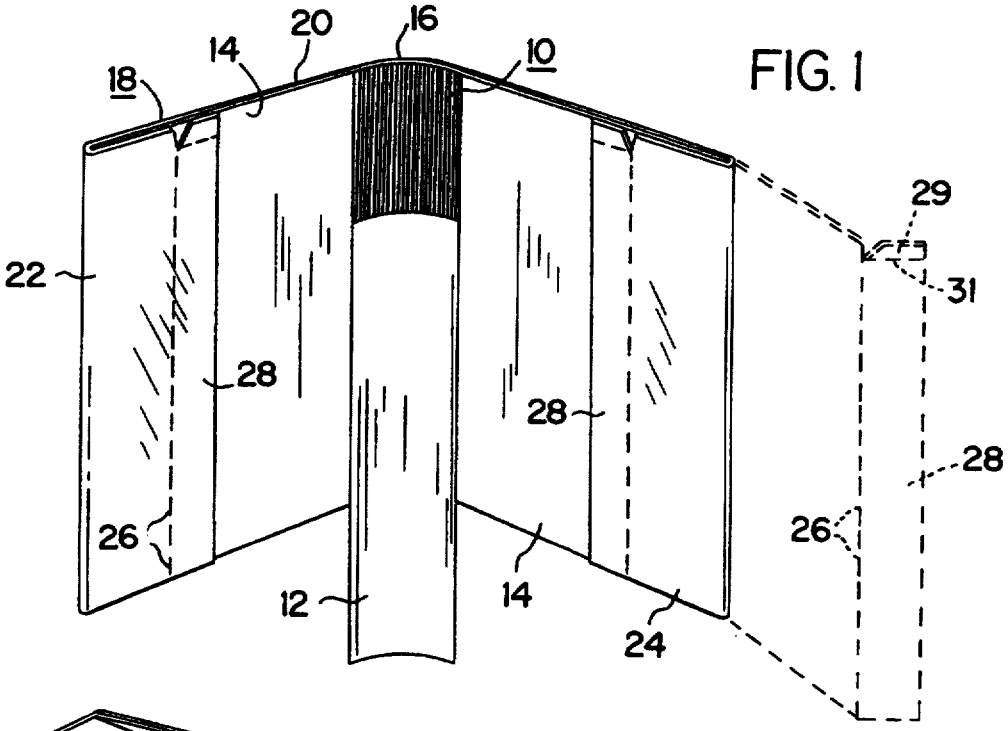
FIG. 1
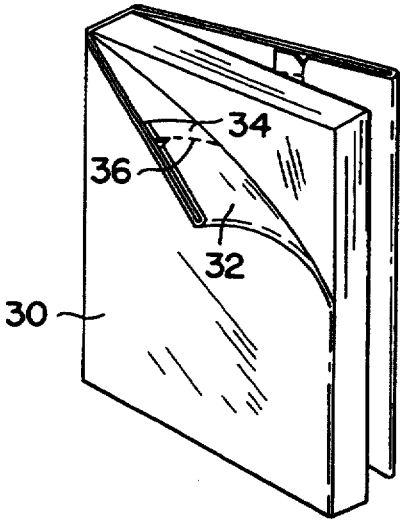
FIG. 2
FIG. 3
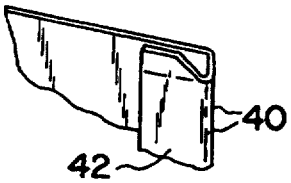
FIG. 4
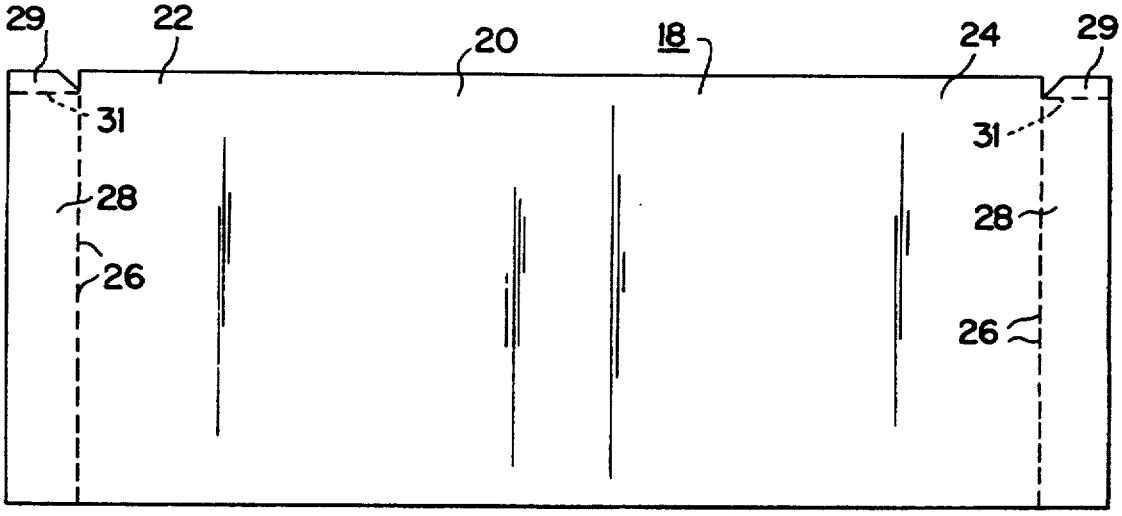

REMOVABLE BOOK MARKER STRIP

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a dust shield [or protective cover] for a book of the so-called "hard [cover] *back*" type, *or a protective cover for a book of the so-called "soft back" type,* wherein in addition to the function of acting as a dust shield *or protective cover,* [to protect the book, the dust shield has] a perforated, readily removable [stip at] *strip on* the [outer edge] *flap* of the dust shield [which] *or the fore edge of the protective cover* may readily be removed and made available to the reader of the book as a book marker.

2. Description of the Prior Art

It has been customary to provide the more expensive books which are generally referred to as the ["hard cover" or] "hard back" books with colorful [protective covers] *dust shields*. In the use of such books, when it is necessary to stop reading them, it is necessary to find a piece of paper or something that can be inserted between the pages to mark the place where the reader should again start to read to continue the continuity of the book. There are apparently no instances available in the prior art where a book marker associated with the book is available in the book to enable a reader to quickly and accurately mark his place of reading in the book. It has long been known that it would be desirable to have a readily usable marker available so that a reader can easily mark the place in the book so that the story can quickly be located when the book is picked up again for reading.

SUMMARY OF THE INVENTION

It is therefore an object of this invention to provide a dust shield or protective cover having a perforated [terminal tab at the end] *strip on a flap or a fore edge, respectively,* which can be readily extracted from the *dust shield or* protective cover and used as a book marker whenever the necessity of a book marker becomes apparent. In the instance of the so-called "paper backs" or books that are sold at more reasonable prices, the [outer] *fore* edges of the [soft back] *protective* covers are perforated along their edges which are turned in to provide book marker segments that can be removed and used as book markers.

BRIEF DESCRIPTION OF THE DRAWINGS

FIG. 1 is a perspective view of a "*hard back*" book with both covers open and a dust shield [or protective cover] over the sides of the book, and illustrating the perforated [book markers] *strips* which can be torn off and used as book markers.

FIG. 2 is a different perspective view of a so-called paper back book having the [outer] *fore* edges of the [soft] *protective* cover turned in and perforated to provide a removable book marker strip.

FIG. 3 is a view similar to FIG. 2 wherein the [inturned] *fore* edge of the [soft copy or paper back] *protective cover* is perforated along the [outer] *page* edge and turned in to provide the book marker.

FIG. 4 is an inside plan view of the dust shield [or protective cover] embodying the invention.

DESCRIPTION OF THE PREFERRED EMBODIMENT

Referring now to FIG. 1, a book 10 is shown in a standing perspective position with the pages 12 of the book shown in a book closed relation. The book has hard backs 14, each having one of their *spine* edges secured in the binding 16 which holds [one] g *the spine* edge of the pages 12 of the book together so that the individual pages 12 can be turned one at a time to permit the reader to read the printing thereon and see the illustrations that are embodied on each of the pages 12 of the book 10.

[Espressed] *Expressed* in more detail, the pages 12 of the book 10 are united at [one edge of] the spine [or] *edge with the* binding 16 by means well known in the art of book binding, and which may encompass gluing, sewing, stapling, or other means.

A dust shield [or protective cover] 18 having a body section 20 as also illustrated in FIG. 4 is of sufficient length to cover the outside of the binding 16 and to wrap around both sides of the hard backs 14 and having in-turned flaps 22 and 24 adapted to be folded over [the outer edges of] the hard backs 14 to clamp the dust shield 18 in place on the book by having the [outer in-turned] flaps 22 and 24 clamped between the hard backs 14 and the pages 12 [of the book on opposite sides] of the book.

The [outer edges of the inturned] flaps 22 and 24 are scored with perforations 26 to provide narrow book marker strips 28 which may be separated from the [inturned] flaps 22 and 24 merely by tearing them along the perforations 26 to make the book marker strips 28 readily available for use as book markers.

In situations where it is desired to show the sales price of the book on the dust shield [20] *18*, a small tab 29 sepaarted for example from the book marker strips 28 by perforations 31 may be provided to show the sales price of the book. It is contemplated that the tab 29 showing the sales price may be torn off in instances where the book is being given as a present.

FIG. 2 illustrates the invention as embodied in [a paper] "*soft* back" *books* [book] wherein the *protective* covers are formed of somewhat heavier material than the pages of the book, and the [outer] *fore* edges of the cover 30 of the book are folded inwardly as shown at 32 and are provided with book marker strips 34 [along the inner edge], and wherein perforations 36 are provided to render the book marker strips 34 readily removable therefrom.

In the embodiment of FIG. 3, the [outer] *fore* edge of the paper back cover 30 of the book is perforated as shown at 40 in alignment with the [outer] *page* edge of the book, and the cover is turned in a short distance to provide a narrow book marker strip 42 which may readily be removed and used as a book marker when the occasion of need therefor arises.

I claim:

[1. The combination with a book having a plurality of stacked pages and a binding securing one edge of the pages together as by gluing, sewing, etc., of covers overlying opposite sides of the stacked pages and secured in the binding, a dust shield overlying the binding and the covers and having inturned flaps, and perforations along the inner edges of one of the flaps to define a removable narrow book marker strip.]

[2. The invention defined in claim 1 wherein the book marker strip is associated with a terminal edge of the dust shield said shield having its terminal edges engaged between the covers and the plurality of pages of the book.]

[3. The invention defined in claim 2 wherein a second book marker strip is positioned along the other edge of the dust shield.]

4. [In a book of the paper back type] *A soft-back book* having a plurality of pages, a binding securing [the] *spine* edges of the pages together[,] *with* a [paper back] *protective* cover of heavier material than the pages of the book [secured to the binding and], *said protective cover* overlying [both] *opposite* sides of the plurality of pages *and said spine edges*, the [outer edges of the paper back covers being turned inwardly, and] *protective cover having* perforations along [the inturned portions] *a fore edge* of the *protective* cover [whereby] *demarcating* a narrow strip *which* may be detached from [each side of the inturned portions] *the protective cover fore edge* and used as a book marker;

*said protective cover is folded along said perforations with said narrow strip interposed between said plurality of pages and said protective cover; and*

*said narrow strip has a width extending from the fore edge which is substantially less than a width, measured between the spine edge and the fore edge, of said soft-back book.*

5. The invention defined in claim 4 wherein the perforations are along the juncture of the paper back and the inturned portion thereof.

*6. The invention defined in claim 4, wherein said perforations are coincident with a fore edge of said plurality of pages.*

*7. The invention defined in claim 4, further comprising said perforations along the fore edge of said protective cover overlying a front of said soft-back book and along the fore edge of said protective cover overlying a back of said soft-back book; and*

*a plurality of said narrow strips.*

*8. The invention defined in claim 4, wherein said width of said narrow strip is less than one half the width of said soft-back book.*

*9. The invention defined in claim 4, further comprising a tab demarcated from said narrow strip by a second set of perforations.*

* * * * *

UNITED STATES PATENT AND TRADEMARK OFFICE

CERTIFICATE OF CORRECTION

PATENT NO. : Re. 34,759

DATED : October 18, 1994

INVENTOR(S) : BOYETT, Gladys D.

It is certified that error appears in the above-identified patent and that said Letters Patent is hereby corrected as shown below:

On title page, item [76] Inventor: BOYETTE should read --BOYETT--.

Signed and Sealed this

Sixth Day of December, 1994

*Attest:*

Bruce Lehman

BRUCE LEHMAN

*Attesting Officer*

*Commissioner of Patents and Trademarks*